United States Patent
Cheng et al.

(10) Patent No.: US 7,075,525 B2
(45) Date of Patent: Jul. 11, 2006

(54) METHOD FOR DESIGNING REFLECTION STRIPES OF AN ACOUSTIC TOUCH SCREEN

(75) Inventors: Eric Cheng, Taipei Hsien (TW); Sunny Wang, Beijing (TW); Yan Sha, Beijing (CN)

(73) Assignee: Onetouch Technologies Co., Ltd., Hsi-Chih (TW)

( * ) Notice: Subject to any disclaimer, the term of this patent is extended or adjusted under 35 U.S.C. 154(b) by 497 days.

(21) Appl. No.: 10/690,803

(22) Filed: Oct. 22, 2003

(65) Prior Publication Data

US 2004/0178999 A1 Sep. 16, 2004

(30) Foreign Application Priority Data

Mar. 11, 2003 (TW) ................ 92105251 A

(51) Int. Cl.
*G09G 5/00* (2006.01)
*G06F 3/43* (2006.01)

(52) U.S. Cl. ................. 345/177; 178/18.04; 178/19.02

(58) Field of Classification Search ........ 345/173–183; 178/18.01–18.11, 19.01–19.07; 367/907; 310/313 D See application file for complete search history.

(56) References Cited

U.S. PATENT DOCUMENTS

| 4,700,176 A * | 10/1987 | Adler .......................... 345/177 |
| 6,236,391 B1 * | 5/2001 | Kent et al. ................... 345/177 |
| 6,396,484 B1 * | 5/2002 | Adler et al. ................. 345/177 |
| 6,567,077 B1 * | 5/2003 | Inoue et al. ................. 345/173 |
| 6,636,201 B1 * | 10/2003 | Gomes et al. ........... 178/18.04 |
| 2003/0234773 A1 * | 12/2003 | Sano et al. .................. 345/177 |
| 2005/0035685 A1 * | 2/2005 | Tanaka et al. ........... 310/313 D |

* cited by examiner

*Primary Examiner*—Bipin Shalwala
*Assistant Examiner*—David L. Lewis
(74) *Attorney, Agent, or Firm*—Quintero Law Office

(57) ABSTRACT

A method for designing reflection stripes of an acoustic touch screen, comprising: dividing a reflection stripe of an acoustic touch screen into a plurality of groups according to an integral times wavelength of an acoustic; according to the distance between said reflection bar increasing principle, increasing the distance between said reflection bars from rear to front; and according to a condition of the transmission loss of a glass surface, cutting the border of said reflection bars in one group with different length.

6 Claims, 2 Drawing Sheets

METHOD FOR DESIGNING REFLECTION STRIPES OF AN ACOUSTIC TOUCH SCREEN

FIELD OF THE INVENTION

The present invention relates generally to an acoustic touch screen. More particularly, the present invention relates to a method for designing reflection stripes of an acoustic touch screen.

BACKGROUND OF THE INVENTION

Generally, the working theorem of an acoustic touch screen is forming a uniform acoustic field on a surface of the glass substrate, and controlling the emitting acoustic and receiving reflection acoustic of the X and Y directions respectively by a computing circuit of a control card. And then computing the vibration of the receiving reflection acoustic to secure the X and Y coordinates of a touch point.

However, there exists a certain loss (about 0.25 dB/CM) while the acoustic transmits over the surface of the glass substrate, therefore, when designing reflection stripes of an acoustic touch screen, for securing the uniform of the reflection acoustic, it must satisfy the following two conditions: (1) the distance between the reflection stripe must be an integral times to an acoustic wavelength $\lambda$ to secure the resonance transmission between two adjacent reflection stripes; (2) for securing the uniform of the reflection acoustic, the distributing condition of the reflection stripe is the reflection stripe must be distributed from sparse to dense to the point of incidence.

The prior art design method almost follows the preceding two conditions to secure the distributing of the reflection stripe elementary, and uses testing method to draw out, increase or decrease the reflection stripe by manpower to achieve a uniform acoustic field on the surface of the glass substrate. However, the acoustic field designed by prior art method while transmission on the surface of the glass substrate is limited by two preceding necessary conditions. During the reflection stripe distributing from sparse to dense to the point of incidence process, there exists a abruptly amplitude vibration of the reflection stripe at $N\lambda$ to $(N-1)\lambda$ distance transition, therefore, the acoustic field designed by prior art method cannot satisfy the flat and the uniform request of the reflection acoustic.

Furthermore, European Patent No. 0,190,734 B1 issued to Adler et al. for [ACOUSTIC WAVE TOUCH PANEL SYSTEM] provides an acoustic wave touch panel system for recognizing and responding to touch along a predetermined coordinate axis on the touch screen (16), the system (10) including surface wave transducer means coupling input and output transducer means (T1, T2; R1, R2), respectively, coupled to the substrate surface (16) and input circuit means (25) associated with the input transducer means (T1, T2) for generating surface wave on the substrate surface (16) in a plurality of paths (Pv, Ph) between the input and output transducers (T1, T2; R1, R2) and output circuit means (23) coupled to the output transducer means (R1, R2) for detecting the position of a touch on the substrate (16) characterized in that the system including surface wave redirecting means (G1, G2, G3, G4) coupled to the substrate surface (16) for redirecting surface wave burst components derived from a burst of surface waves produced by the input transducer means (T1, T2) across the surface (16) to the output transducer means (R1, R2) along a plurality of paths (Pv, Ph) of different lengths which are respectively associated with different positions along the coordinate axis on the substrate surface (16), and the output circuit means (23) being capable of detecting touch-induced amplitude damping of received wave burst components by the fact of that a touch on the substrate surface (16).

Referring to FIG. 1, there shows the reflection stripe design on a touch screen (50) according to the European Patent No. 0,190,734 B1. As shown in FIG. 1, the input transducer means (T1, T2) and output transducer means (R1, R2) positioned respectively on the touch screen (50), wherein, the reflection stripes (51, 52, 53, and 54) are distributed from sparse to dense besides each transducer means (T1, T2; R1, R2) first, these reflection stripes (51, 52, 53, and 54) are assumed a basic shape of a reflection row as follow: the size of each reflection bars is equal and the distance between each reflection bars is equal and forms a 45 angle to the acoustic wave emitting source, etc.

The distance between two adjacent reflection bars is a wavelength of the emitting acoustic wave, such reflection bars row, making the energy dense of the acoustic wave exhaustion gradually, even disappear. As shown in FIG. 1, the acoustic field designed by prior art method follows the two preceding necessary conditions, during the reflection stripe distributing from sparse to dense to the point of incidence process, there exists a abruptly amplitude vibration of the reflection stripe at $N\lambda$ to $(N-1)\lambda$ distance transition, therefore, the acoustic field designed by prior art method cannot satisfy the flat and the uniform request of the reflection acoustic.

SUMMARY OF THE INVENTION

It is an object of the present invention to provide a method for designing reflection stripes of an acoustic touch screen, which cuts the border of the reflection bars in one group with different length according to a condition of the transmission loss of a glass surface, so as to achieve the flat and the uniform request of the reflection acoustic.

In accordance with one embodiment of the invention, a method for designing reflection stripes of an acoustic touch screen is provided comprising the steps of: dividing a reflection stripe of an acoustic touch screen into a plurality of groups according to an integral times wavelength of an acoustic; according to the distance between the reflection bars increasing principle, increasing the distance between the reflection bars from rear to front; and according to a condition of the transmission loss of a glass surface, cutting the border of the reflection bars in one group with different length.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
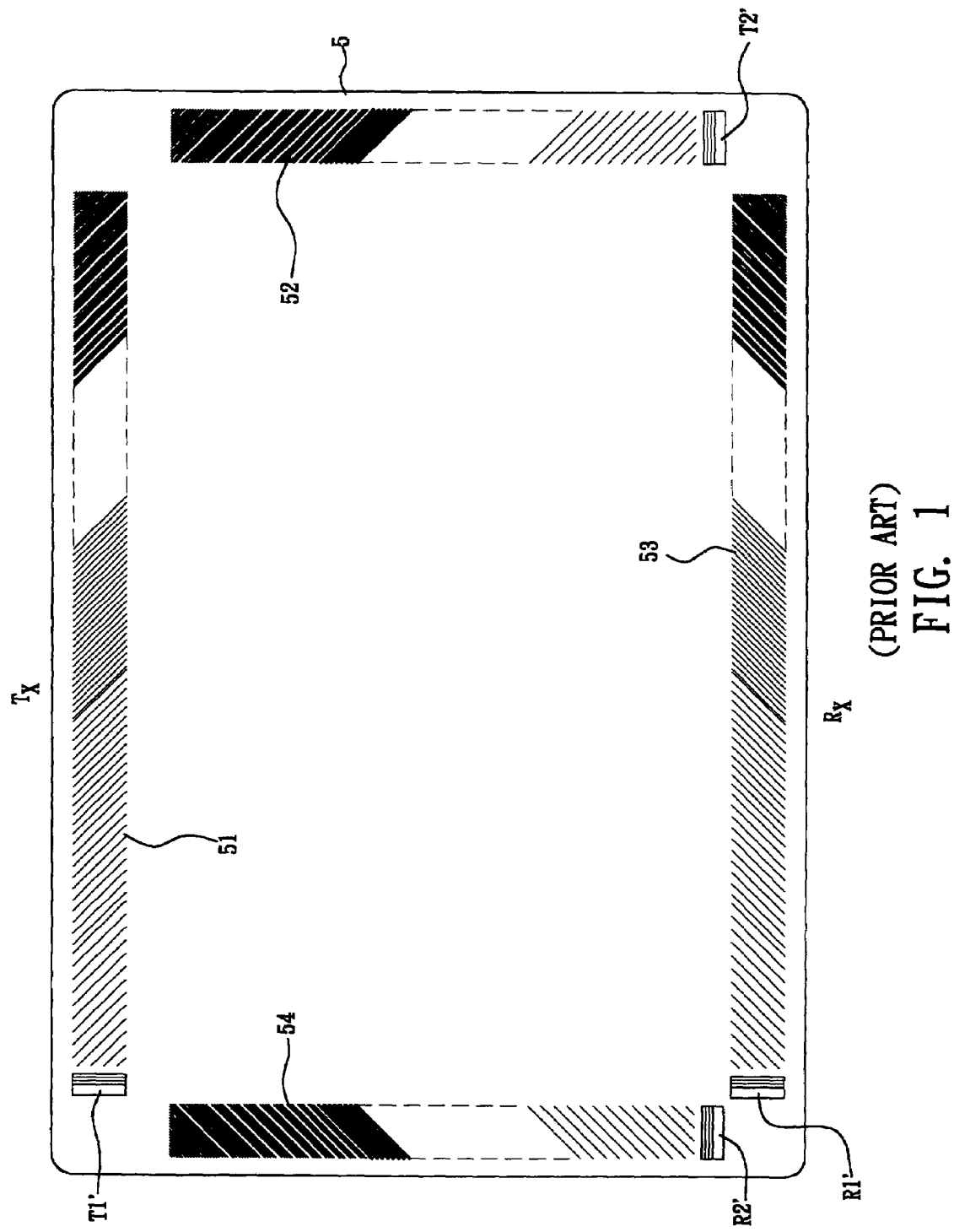
FIG. 1 is a reflection stripe of an acoustic touch screen in accordance with the prior art.
Figure 2:
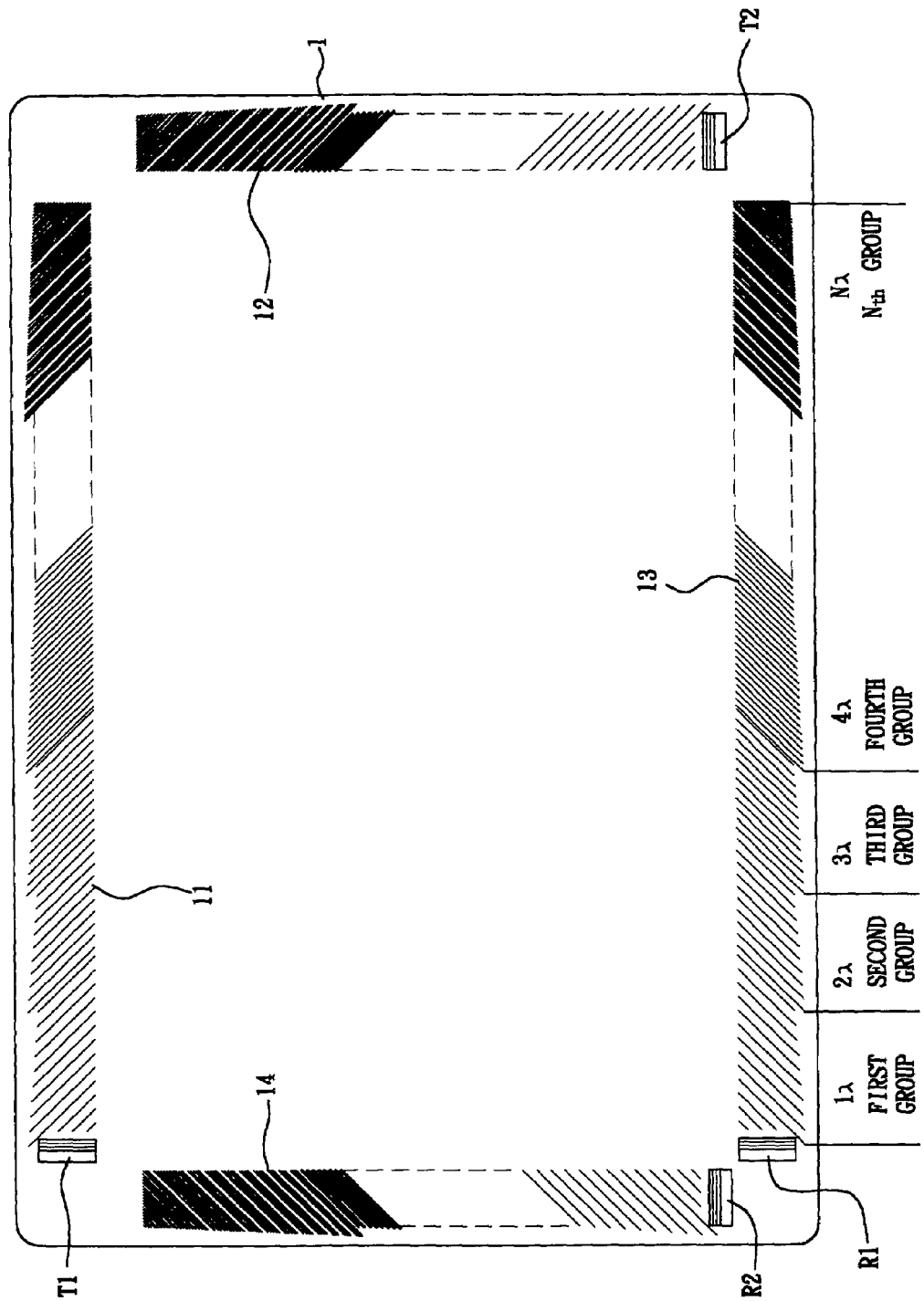
FIG. 2 is a reflection stripe of an acoustic touch screen in accordance with one embodiment of the present invention.

Referring to FIG. 2, there is shown a reflection stripe of an acoustic touch screen in accordance with one embodiment of the present invention. The method of the present invention is used to design the reflection stripe of an acoustic touch screen 1, which comprises: input transducer means T1, T2 and output transducer means R1, R2 positioned respectively on the touch screen 1, wherein, each reflection stripes 11, 12, 13 and 14 has a plurality of bars respectively, and the plurality of bars are distributed from sparse to dense beside each transducer means T1, T2; R1, R2, and formed a saw tooth shape. The acoustic wave is transmitted from the input transducer means T1, and passed through the Nth group reflection bars with $N\lambda$ wavelength bar distance, the (N-1)th group reflection bars with $(N-1)\lambda$ wavelength bar distance, the (N-2)th group reflection bars with $(N-2)\lambda$ wavelength bar distance, . . . , the second group reflection bars with $2\lambda$ wavelength bar distance and the first group reflection bars with $1\lambda$ wavelength bar distance of the reflection stripes 11 to the output transducer means R1. In the Nth group reflection bars, the (N-1)th group reflection bars, the (N-2)th group reflection bars, . . . , the second group reflection bars and the first group reflection bars of the reflection stripe 11, the Nth group reflection bars has the largest $N\lambda$ wavelength bar distance because it is the most reflection bars group closed to the input transducer means T1. The (N-1)th group reflection bars having $(N-1)\lambda$ wavelength bar distance, the (N-2)th group reflection bars having $(N-2)\lambda$ wavelength bar distance, . . . , the second group reflection bars having $2\lambda$ wavelength bar distance and the first group reflection bars having $\lambda$ wavelength bar distance, the bar distance of each group reflection bars is decreased until $1\lambda$ so as to meet the two preceding necessary conditions.

The method of the present invention comprises the steps of: dividing the reflection stripe 11, 12, 13 and 14 of an acoustic touch screen 1 into a plurality of groups according to an integral times wavelength of an acoustic respectively (step 1); according to the distance between the reflection bars increasing principle, increasing the distance between the reflection bars of the reflection stripes 11, 12, 13 and 14 from rear to front respectively (step 2); and according to a condition of the transmission loss of a glass surface of the acoustic touch screen 1, cutting the border of the reflection bars in one group with different length (step 3).

Wherein, in step 1, the method of the present invention divides the reflection stripes 11, 12, 13 and 14 of the acoustic touch screen 1 into N groups respectively according to an integral times wavelength of an acoustic so as to secure the resonance transmission between two adjacent reflection bars. In step 2, the method of the present invention increasing the distance between the reflection bars of the reflection stripes 11, 12, 13 and 14 from rear to front according to the distance between the reflection bars increasing principle, in another word, the Nth group reflection bars with the $N\lambda$ wavelength bar distance is positioned beside the input transducer means T1, and then the (N-1)th group reflection bars with $(N-1)\lambda$ wavelength bar distance, the (N-2)th group reflection bars with $(N-2)\lambda$ wavelength bar distance, . . . , the second group reflection bars with $2\lambda$ wavelength bar distance and the first group reflection bars with $\lambda$ wavelength bar distance are positioned in sequence so as to secure the uniform of the reflection acoustic wave. In step 3, the method of the present invention cuts the border of the reflection bars in one group with different length according to a condition of the transmission loss of a glass surface of the acoustic touch screen 1. After cutting the border of the reflection bars in one group, it can improve the defect of the prior art design method that has abruptly amplitude vibration of the reflection bar at $N\lambda$ to $(N-1)\lambda$ distance transition during sparse to dense distributing process so as to form a uniform reflection acoustic wave field.

Wherein cutting the border of the reflection bars in one group with different length is a ladder-shaped border cutting preferably; and the cutting amount of the border of the reflection bars in one group depends on the cutting ratio of the glass substrate. The definition of the cutting ratio Q/K of the ladder-shaped border cutting is the density of the glass dividing the loss of the glass, wherein, Q represents the density of the glass and K represents the loss of the glass, and the cutting ratio Q/K is 0.6~0.9 preferably, while the cutting amount of the border is about 10%~40% preferably.

Wherein, the integral times wavelength is 50 to 60 times wavelength preferably. The amount of the reflection stripes can vary depending on the size of the touch screen 1, for example, a 12 inch touch screen 1 can divide the stripes 11, 12, 13 and 14 into 8 groups, while a 15 inch touch screen 1 can divide the stripes 11, 12, 13 and 14 into 12 groups respectively, such module design can reduce the manufacturing cost and improve the defect of the prior art design method that needs to test and modify by manpower.

While the invention has been described with reference to a preferred embodiment thereof, it is to be understood that modifications or variations may be easily made without departing from the spirit of this invention, which is defined by the appended claims.

What is claimed is:

1. A method for designing reflection stripes of an acoustic touch screen, wherein said acoustic touch screen has at least one reflection stripe, and each reflection stripe has a plurality of reflection bars, said method comprises the steps of:
   dividing each reflection stripe of an acoustic touch screen into a plurality of groups according to an integral times wavelength of an acoustic;
   according to the distance between said reflection bars increasing principle, increasing the distance between said reflection bars from rear to front; and
   according to a condition of the transmission loss of a glass surface, cutting the border of said reflection bars in one group with different length.

2. A method for designing reflection stripes of an acoustic touch screen as claimed in claim 1, wherein said integral times wavelength is 50 to 60 times wavelength preferably.

3. A method for designing reflection stripes of an acoustic touch screen as claimed in claim 1, wherein said cutting the border of said reflection bars in one group with different length is a ladder-shaped border cutting preferably.

4. A method for designing reflection stripes of an acoustic touch screen as claimed in claim 3, wherein the amount of said cutting the border of said reflection bars in one group with different length is about 10%~40% preferably.

5. A method for designing reflection stripes of an acoustic touch screen as claimed in claim 3, wherein said cutting ratio of said ladder-shaped border cutting is about 0.6~0.9.

6. A method for designing reflection stripes of an acoustic touch screen as claimed in claim 5, wherein the definition of said cutting ratio of said ladder-shaped border cutting is the density of said glass dividing the loss of said glass.

* * * * *